United States Patent [19]

Graalmann et al.

[11] Patent Number: 4,885,206

[45] Date of Patent: Dec. 5, 1989

[54] FOAM COMPOSITE AND MANUFACTURE THEREOF

[75] Inventors: Onno Graalmann, Dossenheim; Guenter Kreibiehl; Gerhard Turznik, both of Ludwigshafen; Heinz Weber, Gruenstadt, all of Fed. Rep. of Germany

[73] Assignee: BASF Aktiengesellschaft, Ludwigshafen, Fed. Rep. of Germany

[21] Appl. No.: 350,150

[22] Filed: May 5, 1989

[30] Foreign Application Priority Data

May 18, 1988 [DE] Fed. Rep. of Germany ....... 3816858

[51] Int. Cl.$^4$ ................................................ B32B 3/26
[52] U.S. Cl. ............................... 428/316.6; 428/473.5
[58] Field of Search ........................... 428/316.6, 473.5

[56] References Cited

U.S. PATENT DOCUMENTS

| 3,966,652 | 6/1976 | Gagliani et al. . |
| 4,296,208 | 10/1981 | Gagliani et al. . |
| 4,426,463 | 1/1984 | Gagliani et al. . |
| 4,599,365 | 7/1986 | Gagliani et al. . |
| 4,604,409 | 8/1986 | Gagliani et al. . |

FOREIGN PATENT DOCUMENTS

| 17672 | 11/1977 | European Pat. Off. . |
| 17671 | 2/1980 | European Pat. Off. . |

*Primary Examiner*—Morton Foelak
*Attorney, Agent, or Firm*—Oblon, Spivak, McClelland, Maier & Neustadt

[57] ABSTRACT

A flexible foam composite of high flame resistance consists of one or more layers of a flexible melamine resin foam from 4 to 25 g/l in density and one or more layers of a flexible polyimide foam from 8 to 40 g/l in density.

1 Claim, No Drawings

FOAM COMPOSITE AND MANUFACTURE THEREOF

The present invention relates to, foam composites comprising a flexible melamine resin foam and a flexible polyimide foam.

European Pat. Nos. 17,671 and 17,672 disclose flexible foams based on a melamine-formaldehyde condensation product which are notable for low density, good heat and sound insulation capability and favorable mechanical properties. They show standard or low flammability under German Standard Specification DIN 4102. Such melamine resin foams, however, are not very fire resistant and have decomposition temperatures of distinctly below 300° C.

U.S. Pat. Nos. 3,966,652; 4,296,208; 4,426,463; 4,599,365; and 4,604,409 disclose the production of resilient polyimide foams which are notable for favorable mechanical properties and excellent flame resistance. The disadvantage here is the high cost of the starting materials required.

It is an object of the present invention to produce flexible foams which, compared with melamine resin foams, show improved fire resistance and which are less costly than polyimide foams.

We have found, surprisingly, that this object is achieved by coating the surface of flexible melamine resin foams with a flexible polyimide foam to produce in this inexpensive way flexible foam composites of excellent flame resistance.

The flexible open-celled foams known from EP-B-17,671 and -17,672 are suitable.

The present invention accordingly provides a foam composite consisting of
(a) one or more layers of a flexible melamine resin foam from 4 to 25 g/l in density and
(b) one or more layers of a flexible polyimide foam from 8 to 40 g/l in density.

The present invention further provides a process for manufacturing a foam composite, which comprises applying to either or both of the sides of a sheet of a flexible melamine resin foam a polyimide precondensate which contains a blowing agent, placing no, one or more further such sheets on top, and heating to expand and cure the precondensate.

The foam composites according to the invention contain one or more layers of a flexible melamine resin foam based on a melamine/formaldehyde condensation product containing not less than 50% by weight, preferably not less than 80% by weight, of cocondensed melamine and formaldehyde units and may contain up to 50, preferably up to 20, % by weight of other amino-, amido- or carboxyl-containing thermosetting agents on the one hand and aldehydes on the other as cocondensed units. They are characterized by the following properties:

(a) the preliminary density as defined by German Standard Specification DIN 53 420 is from 4 to 25, preferably from 8 to 15, in particular from 9 to 12 [$kg/m^3$];
(b) the heat conductivity number as defined by German Standard Specification DIN 52612 is less than 0.06, preferably less than 0.05, and in particular less than 0.04 [$W.m.^{-1}K^{-1}$];
(c) the compression hardness as defined by German Standard Specification DIN 53 577 at 60% compression, divided by the preliminary density, is less than 0.3, preferably less than 0.2 [$N.cm^{-2}/g.l^{-1}$], the determination of the compression hardness at 60% compression having to be followed by recovery of the foam to not less than 70%, preferably not less than 80%, and in particular not less than 90%, of its original dimension;
(d) the compressive stress at 10% compression as defined by German Standard Specification DIN 53 421 is 0.005–0.05 $N/mm^2$;
(e) by German Standard Specification DIN 4102 they show at least standard flammability resistance and preferably show low flammability;
(f) the tensile strength as defined by German Standard Specification DIN 53 571 is preferably not less than 0.07, in particular not less than 0.1, $N.mm^{-2}$.

The thickness of the layer is in general from 10 to 120 mm, preferably from 20 to 100 mm, in particular from 25 to 60 mm.

The foam composites according to the invention further contain one or more layers of a flexible polyimide foam from 8 to 40 g/l in density.

Suitability is possessed by the flexible polyimide foams known from U.S. Pat. Nos. 4,966,652; 4,296,208; 4,426,463; 4,599,365; and 4,604,409 based on condensation products of aromatic tetracarboxylic acids or anhydrides thereof and aromatic and/or heteroaromatic diamines. The tetracarboxylic acids used are inter alia pyromellitic acid, 3,3',4,4'-diphenyltetracarboxylic acid and 3,3',4,4'-benzophenonetetracarboxylic acid. Suitable diamines are 3,3'- and 4,4'-diaminodiphenyl ethers, para- and meta-phenylenediamines, 2,6- and 2,4-diaminotoluenes, diaminodiphenylmethane and 2,6-diaminopyridine. Preference is given to polyimides based on 3,3',4,4'-benzophenonetetracarboxylic anhydride and 4,4,-diaminodiphenylmethane and 2,6-diaminopyridine. The 2,6-diaminopyridine may also be replaced as a whole or in part by melamine.

The polyimide foams used have in general a heat conductivity number, as defined by German Standard Specification DIN 52 612, of less than 0.04 W/mK, a compression hardness, as defined by German Standard Specification DIN 53 577, at 40% compression of less than 10 kPa and a tensile strength of 50–150 kPa.

The polyimide foam layer has in general a thickness of from 3 to 80 mm, preferably from 5 to 30 mm, in particular from 10 to 20 mm.

The foam composite has at least one outer polyimide foam layer. The melamine resin foam can also be coated with the polyimide foam on both sides, and it may contain further layers of polyimide foam on the inside.

The total thickness of the foam composite is in general from 13 to 200, in particular from 25 to 130, mm. It preferably takes the form of sheetings and sheets, but may also take any other desired form, according to the intended use.

The foam composites can be manufactured for example by adhesively bonding together the individual layers.

Advantageously, starting from a flexible melamine resin foam, a polyimide precondensate which contains a blowing agent is applied to the surface of the melamine resin foam and is then heated to make it expand and cure.

The resistance to mechanical, thermal and flame stress can be increased by means of an interleaf of glass fabric. The mesh size of the glass fabric ranges from $1 \times 1$ to $3.5 \times 3.5$ mm.

The polyimide precondensate used is the reaction product of the aromatic tetracarboxylic acid, a lower alcohol such as methanol or ethanol and the aromatic diamine. It is prepared by first reacting the aromatic tetracarboxylic acid or anhydride with the alcohol at from about 50° to 100° C. to form the acid half ester and then mixing the half ester with the diamine. Tetracarboxylic acid and diamine are used in approximately stoiciometric amounts, i.e. 1 amino group per 2 carboxyl groups or per 1 carboxylic anhydride group. Per mole of tetracarboxylic acid or anhydride from about 3 to 10 moles of alcohol are used. Advantageously, the precondensate is mixed with a small amount of a surface-active substance, for example a fluorosurfactant.

The chemically bonded alcohol of the precondensate also acts as the blowing agent. The precondensate can be converted, for example by means of a spray dryer, into a pulverulent product. The precondensate can also be applied directly to the melamine resin foam by means of customary spray means or other applicator means. The foam can also be uniformly coated with the precondensate powder. On heating, for example by means of infrared radiation, microwave radiation or a hot air oven, the precondensate foams up and becomes bonded to the melamine resin foam. Heating is in general continued at from 250° to 300° C. until the polyimide foam has become cured.

EXAMPLES

Example 1

One mole of 3,3',4,4'-benzophenonetetracarboxylic dianhydride is reacted with seven times the molar amount of ethanol to give the acid (half) ester. Following addition of the anhydride to the alcohol the mixture is stirred at slightly below the boiling point of the alcohol for about an hour, then cooled down to 45° C. and admixed with a mixture of 0.3 mole of 2,6-diaminopyridine and 0.7 mole of 4,4'-diaminodiphenylmethane. This mixture is kept at 50°-65° C. for five minutes and is then cooled down in an ice bath to room temperature. To the solution is added with stirring 0.3% of a fluorosurfactant (Zonyl FSC from E.I. Du PONT DE NEMOURS & Co.).

The resin thus obtained is adjusted with the above-mentioned alcohol to a viscosity of about 170 mPas, which corresponds to a solids content of about 60%. The solution obtained is then spray dried in a conventional Mini Spray Dryer 190 from Büchi. The powder produced in this manner, which has a particle size of less than 200 micrometers and a residual moisture content of about 20%, is applied in uniform thickness and in an amount of 220 g/m² by drawdown to 50 mm thick sheets of a flexible melamine resin foam of density 11 g/1 (BASOTECT from BASF Aktiengesellschaft) and foamed and cured at 270° C. by means of a customary hot air laboratory oven. The result obtained is a largely open-celled flexible foam composite having a density of 20 g/1. The thickness of the polyimide foam is 20-25 mm and its density is 40 g/1.

The fire resistance of the composite on testing with a natural gas/air burner (about 1,150° C., 15 1 of gas/h, 45 1 of air/h) lasts for 10 minutes and consequently is significantly above that of the base material. The force required to separate the composite is 2.5 N/cm.

Example 2

The resin and the powder are produced as described in Example 1. The subsequent application is carried out continuously using a vibrating chute, and the subsequent foaming and curing is effected by means of IR radiators emitting at a wavelength of 1.9-8 micrometers with a power output of 400 W per radiator which have been fitted into a rectangular duct. The thickness of the polyimide layer is adjusted to 15 mm, and the density to 0 g/1. The sound absorption provided by the composite is 0% at 1,000 Hz, and it shows a compressive strain at 10% compression of 0.01 N/mm².

Example 3

The resin is produced as described in Example 1 and diluted to about 150 mPas. The resin solution thus obtained is applied to BASOTECT by means of a conventional compressed air spray gun. The article is introduced into a through-circulation air cabinet at 200° C. for foaming and subsequent curing.

The properties of the foam composite are similar to those of Examples 1 and 2, prorated for the thickness of the coating.

Example 4

The powder is prepared as described in Example 1. However, the melamine foam has placed on it a glass fabric having a basis weight of 200 g/1 and is subsequently uniformly coated with the polyimide resin powder. This is followed by foaming and curing. The resulting reinforced foam composite shows greater strength in various tests. For instance, its fire resistance duration (see Example 1) is not less than 14 minutes.

We claim:
1. A foam composite consisting of
    (a) one or more layers of a flexible melamine formaldehyde resin foam from 8 to 25 g/1 in density and
    (b) one or more layers of a flexible polyimide foam from 8 to 40 g/1 in density.

* * * * *